United States Patent
Shurvinton et al.

(10) Patent No.: US 7,019,710 B1
(45) Date of Patent: Mar. 28, 2006

(54) ANTENNA SYSTEM

(75) Inventors: Bill Shurvinton, Hartley Wintney (GB); Chris Hancock, Winchester (GB)

(73) Assignee: Nokia Corporation, Espoo (FI)

(*) Notice: Subject to any disclaimer, the term of this patent is extended or adjusted under 35 U.S.C. 154(b) by 90 days.

(21) Appl. No.: 10/149,361

(22) PCT Filed: Nov. 24, 2000

(86) PCT No.: PCT/EP00/11748

§ 371 (c)(1),
(2), (4) Date: Feb. 7, 2003

(87) PCT Pub. No.: WO01/43469

PCT Pub. Date: Jun. 14, 2001

(30) Foreign Application Priority Data

Dec. 10, 1999 (GB) .................. 9929375

(51) Int. Cl.
*H01Q 21/00* (2006.01)
(52) U.S. Cl. .................. 343/853; 342/375; 455/561
(58) Field of Classification Search .............. 343/853, 343/754; 455/561, 562, 562.1; 342/373, 342/374, 375

See application file for complete search history.

(56) References Cited

U.S. PATENT DOCUMENTS

| | | | | |
|---|---|---|---|---|
| 5,521,904 | A | * | 5/1996 | Eriksson et al. ............ 370/249 |
| 5,532,706 | A | * | 7/1996 | Reinhardt et al. .......... 343/778 |
| 5,956,327 | A | * | 9/1999 | Faerber et al. .............. 370/330 |
| 6,043,790 | A | * | 3/2000 | Derneryd et al. ........... 343/853 |
| 6,161,024 | A | * | 12/2000 | Komara .................... 455/562.1 |
| 6,448,938 | B1 | * | 9/2002 | Chiang et al. .............. 343/850 |
| 6,658,269 | B1 | * | 12/2003 | Golemon et al. ........... 370/315 |

FOREIGN PATENT DOCUMENTS

WO    WO 97/41642    11/1997

* cited by examiner

*Primary Examiner*—Tan Ho
(74) *Attorney, Agent, or Firm*—Lackenbach Siegel, LLP

(57) ABSTRACT

An antenna system for a transmitter, said antenna system comprising an array of antennas, said array being controllable to transmit a signal over part or all of a coverage area of said transmitter; an amplifier coupled to each antenna, said amplifier being arranged to receive one or more signals to be transmitted by the respective antenna; and a further amplifier connected to at least one of said antennas, said further amplifier arranged to receive a signal to be transmitted over substantially all of the coverage area of said transmitter.

13 Claims, 6 Drawing Sheets

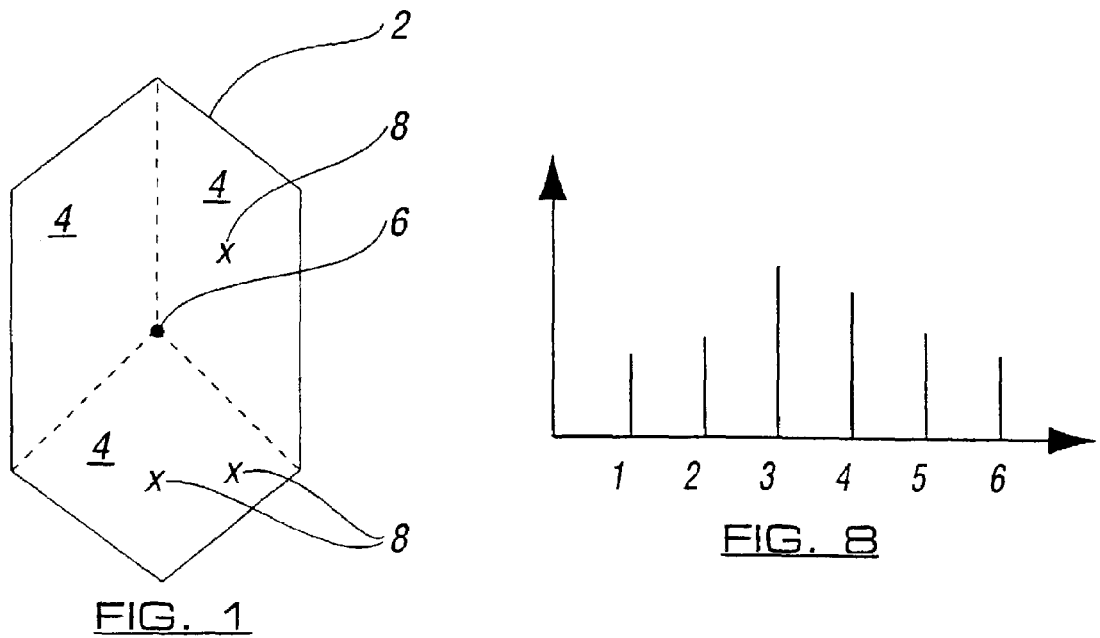
FIG. 1
FIG. 8
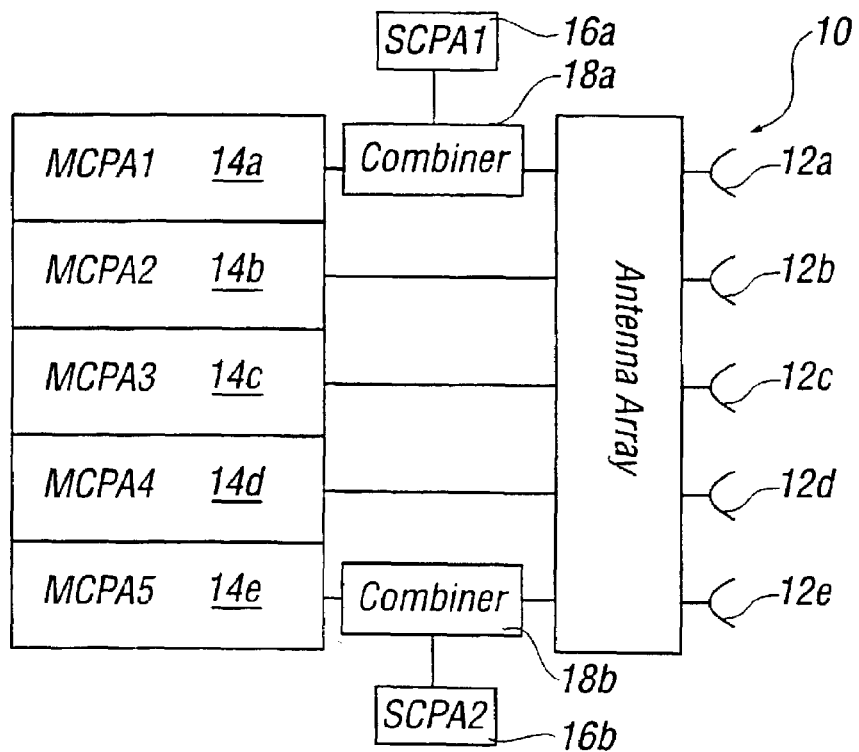
FIG. 2

ANTENNA SYSTEM

FIELD OF THE INVENTION

The present invention relates to an antenna system and in particular but not exclusively to an antenna system for use in a base transceiver station of a wireless telecommunications network.

BACKGROUND TO THE INVENTION

An area covered by a cellular telecommunications network is divided into a plurality of cells. Each of these cells has a base station which is arranged to transmit signals to and receive signals from mobile stations located in the cell associated with the respective base station. Mobile stations will be in active communication with the base station associated with the cell in which the mobile station is located.

In order to improve the capacity and/or the signal to interference ratio, beam steering or beam selection techniques have been proposed. With beam steering or selection techniques, a base station is able to generate one or more beams. In the case of beam selection, the base station will be capable of producing a fixed number of beams to cover the cell associated with the base station. In certain conditions, not all of the beams will be selected for communication with a given mobile station. For example, if it can be determined where the mobile station in question lies in the cell, the beam or beams which cover that part of the cell in which the mobile station is located only will be selected to transmit a signal. Accordingly, that signal for the mobile station in question will not be transmitted in the other non selected beam directions.

Beam steering uses a similar concept. Rather than having a fixed number of beams, the number of beams which are generated can be varied and the width of those beams can be varied. As with the beam selection technique, one or more beams can be generated, in appropriate circumstances, to transmit a signal over only part of the cell.

With both of these techniques, as not all signals are transmitted throughout the whole cell, the interference generated is reduced, which can allow an increase in capacity to be achieved. Both of these techniques use an array of antennas in order to generate the beams.

In addition to transmitting signals which are intended for a given mobile station, the base transceiver station is also arranged to transmit a reference signal which is used by all of the mobile stations in the cell associated with that base transceiver station. Accordingly, this reference signal must be transmitted throughout the cell. In GSM (Global System for Mobile Communications), the reference channel is the BCCH (Broadcast Control Channel).

In GSM, frequency division multiple access is used in combination with time division multiple access. This means that a channel for a mobile station is defined by the carrier frequency used and the associated time slot on that frequency. Accordingly, a base transceiver station will be arranged to use a range of different frequency carriers. Multi carrier power amplifiers are therefore used to drive each element of an antenna array which allows beam steering or selection to be achieved. In order to also provide the BCCH channel, two solutions have been proposed. Firstly, an additional antenna is provided for the BCCH channel which transmits the BCCH channel over the entire cell associated with the base transceiver station. However, this is disadvantageous in that the provision of an additional antenna incurs additional costs.

In the second solution which has been proposed, no additional antennas are provided. Rather, the antennas which provide the beams are also used to transmit the BCCH channel throughout the cell. However, this has the disadvantage that the power requirements for the multi carrier power amplifiers has to be significantly increased to ensure that it is always possible to transmit the BCCH channel throughout the cell. The requirement for the multi carrier power amplifiers to have an increased power requirement increases the costs associated with the power amplifiers.

SUMMARY OF THE INVENTION

It is therefore an aim of embodiments of the present invention to provide an antenna system which is able to address the disadvantages of the proposed solutions.

According to the first aspect of the present invention there is provided an antenna system for a transmitter, said antenna system comprising an array of antennas, said array being controllable to transmit a signal over part or all of a coverage area of said transmitter; an amplifier coupled to each antenna, said amplifier being arranged to receive one or more signals to be transmitted by the respective antenna; and a further amplifier connected to at least one of said antennas, said further amplifier arranged to receive a signal to be transmitted over substantially all of the coverage area of said transmitter.

Preferably, the amplifier connected to each antenna is a multi carrier amplifier which is arranged to receive a plurality of signals at different frequencies. Alternatively, the amplifier connected to each antenna may be a single carrier amplifier which is arranged to receive signals in a single frequency range.

Preferably, the third amplifier is a single carrier amplifier. Preferably, at least two of the antenna are connected to respective further amplifiers.

The said at least one antenna to which the or each further amplifier is connected may be at an end of an array. An output of the further amplifier and an output of the amplifier connected to the same antenna as the further amplifier may both be connected to an output of a combiner, an output of which is connected to the same antenna. The combiner may be a hybrid.

In preferred embodiments of the present invention, the antenna array is a smart antenna array. The antenna array may provide a predetermined number of beam directions one or more of which are selectable.

Embodiments of the present invention may be incorporated in a base transceiver station. The or each further amplifier may be arranged to receive a reference signal which, in the GSM standard, may be the BCCH channel.

BRIEF DESCRIPTION OF DRAWINGS

For a better understanding of the present invention and as to how the same may be carried into effect, reference will now be made by way of example to the accompanying drawings in which:—

FIG. 1 shows a cell of a telecommunications network with which embodiments of the present invention can be used;

FIG. 2 shows a block diagram of an embodiment of the present invention;

FIG. 8 shows a graph of the power applied to each antenna element.

DETAILED DESCRIPTION OF EMBODIMENTS OF THE PRESENT INVENTION

Figure 3:
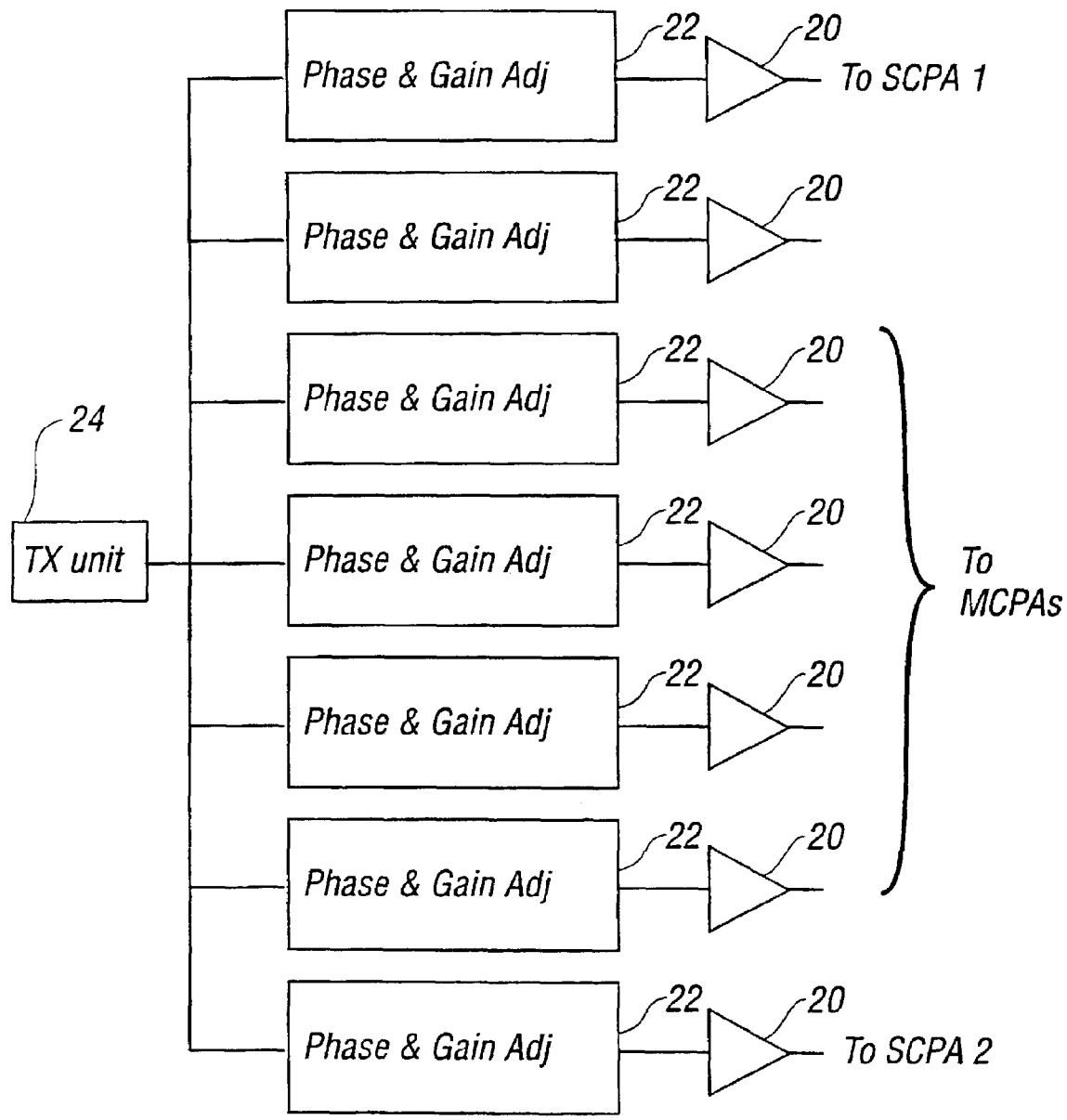
FIG. 3 shows components which are arranged upstream of the power amplifiers of FIG. 2.

Reference is made to FIG. 1 which shows part of a cellular telecommunications network 2 in which embodiments of the present invention can be implemented. The area covered by the network is divided into a plurality of cells, three of which are shown in FIG. 1. Each cell 4 has associated therewith a base transceiver station 6. In the example shown in FIG. 1, the base transceiver station associated with each cell 4 is provided at a common location. The base transceiver stations 6 are arranged to communicate with mobile terminals 8 located in the cell 4 associated with a given base station.

The embodiment of the present invention will be described in the context of a GSM system. It should however be appreciated that embodiments of the present invention can be used with any other system such as other frequency division multiple access systems, time division multiple access systems and spread spectrum systems such as code division multiple access. Embodiments of the present invention can also be used with hybrids of one or more of the above systems.

Reference is made to FIG. 2 which shows an embodiment of the present invention. In particular, FIG. 2 shows part of a base transceiver station which provides a steered beam system. This steered beam system is sometimes referred to as a smart antennas system. It should be appreciated that embodiments of the present invention can also be used with beam selection arrays.

The antenna array 10 illustrated in FIG. 2 comprises five antennas 12*a*–*e*. Each antenna is made up of one or more antenna elements. For example, each antenna may comprise a column or stack of antenna elements. In the embodiment shown in FIG. 2, five antenna are shown. However, alternative embodiments of the present invention may have different numbers of antennas.

In one preferred embodiment of the present invention, six or eight antennas are provided.

Each antenna 12 is connected to a respective multi carrier power amplifier 14*a*–*e*. The multi carrier power amplifiers amplify the signals which they receive and output the amplified signals to the associated antenna 12. The power amplifiers 14 are multi carrier power amplifiers. This means that the power amplifier is able to amplify signals having different radio frequencies which are received at the same time. In this way, the antenna array 10 is able to transmit signals having different frequencies at the same time.

The arrangement shown in FIG. 2 also includes two further amplifiers 16*a* and 16*b*. These two amplifiers are single carrier amplifiers and are arranged to amplify the BCCH signal. The two single carrier power amplifiers 16*a* and 16*b* receive the same signal, that is the BCCH channel. In alternative embodiments of the present invention, only one of the single carrier power amplifiers is provided. In yet another embodiment of the present invention, the single carrier power amplifiers 16 may transmit different signals.

The single carrier power amplifiers 16*a* and 16*b* receive the BCCH channel, amplify the signal and output it to a respective combiner 18*a* and 18*b*.

The first combiner 18*a* has its output connected to the first antenna 12*a* of the array 10. The first combiner 18*a* also receives a second input from the output of the multi channel power amplifier 14*a* which is associated with the first antenna 12*a*. The combiner 18*a*, which in preferred embodiments of the present invention is a hybrid, combines the output of the single carrier power amplifier 16*a* with the output of the first multi carrier power amplifier 14*a* and outputs it to the first antenna element 12*a*.

The second combiner 18*b* is connected to the antenna at the other end of the array, namely antenna 12*e*. As with the first antenna 12*a*, the combiner 18*b* receives an input from the second single carrier power amplifier 16*b* and from the output of the fifth multi carrier power amplifier 14*e* associated with the fifth antenna element 12*e*. The output of the second combiner 18*b* is connected to the fifth antenna 12*e*.

For reasons which will be discussed later, it is advantageous that the first and second combiners be connected to antenna which are at either end of the array. However, in alternative embodiments of the present invention the combiner may be connected to antennas which are not at either end of the array.

Reference will now be made to FIG. 3 which shows some of the elements which are upstream of the multi carrier power amplifiers 14 and single carrier power amplifiers 16. In particular, each of the single carrier power amplifiers and multi carrier power amplifiers receives an input from the output of a respective amplifier 20.

Each amplifier 20 has its input connected to the output of a phase and gain adjustment block 22. Each phase and gain adjustment block 22 alters the phase and gain of the signal so that the antenna array 10 is able to provide steered beams. The way that the beams are generated is by providing the same signal to one or more of the antenna elements. The phase difference between the versions of the same signal applied to the different antennas 12 cause constructive and/or destructive interference to occur so that a beam in a required direction can be generated. The phase of a given signal to be applied to the required antenna 12 is thus adjusted by the respective phase and gain adjustment blocks 22. The gain selected by the phase and gain adjustment blocks 22 determine the power with which a signal is transmitted by the respective antenna 12. The amplifiers 20 amplify the signals received from the respective phase and gain adjustment block.

The input of each phase and gain adjustment block 22 is connected to the output of a transmit unit 24 which provides the signals which are to be transmitted. The signals which are input to the phase and gain adjustment blocks 22 are radio frequency signals. The transmit unit 24 thus converts signals from a base band frequency to a radio frequency. However, the function of unit 24 will be discussed in more detail in relation to FIG. 4.

Figure 4:
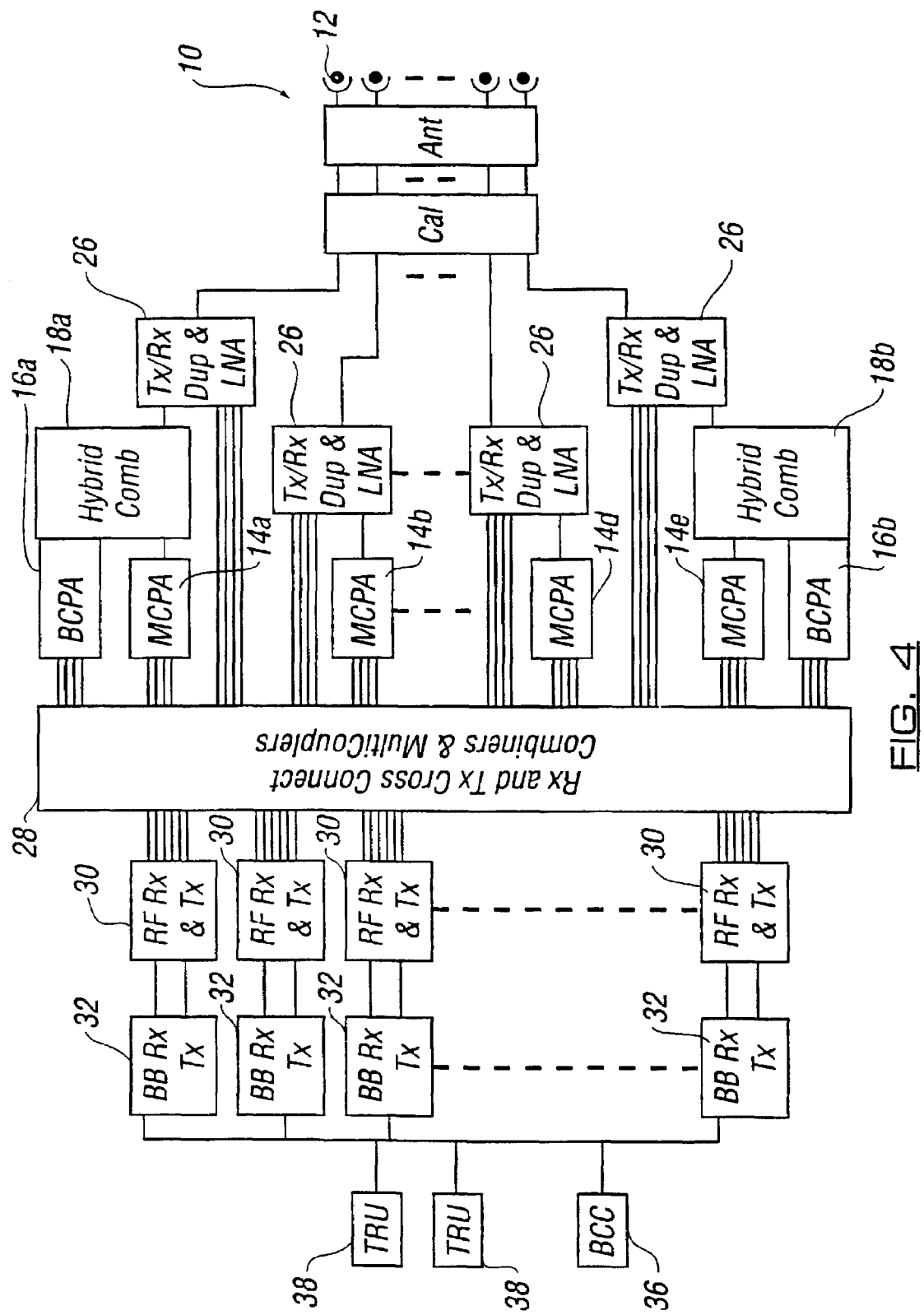
FIG. 4 is a block diagram of the embodiment of the present invention in more detail.

Reference is now made to FIG. 4 which shows the embodiment of the present invention in some more detail. Those elements which are the same as in FIGS. 2 and 3 have the same reference number. The circuitry shown in FIG. 4 can be incorporated in a base transceiver station. The antenna array 10 is used not only to transmit signals but also to receive signals. Accordingly, each antenna element 12 is connected to a duplexer 26 which incorporates a low noise amplifier for the receive path. The duplexer 26 therefore receives from the respective antenna 12 signals which have been received by that antenna. Those signals are amplified by the low noise amplifier and are output to a cross connect unit 28 which will be described in more detail hereinafter.

Each duplexer 26 also connects the output of the single carrier and multiple carrier amplifiers 14 and 16 to the respective antenna 12, for the signals to be transmitted. Additionally, the outputs of cross connect unit 28 are connected to the input of all of the amplifiers, both the multi carrier amplifiers 14 and the single carrier power amplifiers 16.

The cross connect unit 28 is connected to a number of radio frequency receive and transmit units 30. The radio frequency receive and transmit units 30 provide two functions. Firstly, for a given radio frequency signal which is to be transmitted, one of the radio frequency unit 30 generates the signals which are to be applied to each of the antennas 12. The circuitry of FIG. 3 is incorporated in the radio frequency units 30.

The second function provided by each radio frequency unit 30 is to receive the different versions of a signal which is received by the respective antennas. For example, a mobile station will transmit a signal to the base station. That signal will be received probably by all of the antennas. The versions of that signal are then connected by the cross connect unit 28 to the same radio frequency receive unit 30.

Each radio frequency unit 30 is connected to a base band unit 32. The base band unit converts signals for transmission which are at a base band to a radio frequency and outputs those signals to the radio frequency unit 30. The base band unit 32 also converts the received signals from the radio frequency to the base band. The base band unit 32 may modulate the signals to be transmitted and demodulate the signals which are received.

The base band units 32 are connected to transmit receive units 38 which process the received signals and generate the signals to be transmitted. A broadcast control channel unit 36 is provided which generates the information for the BCCH channel.

Figure 5:
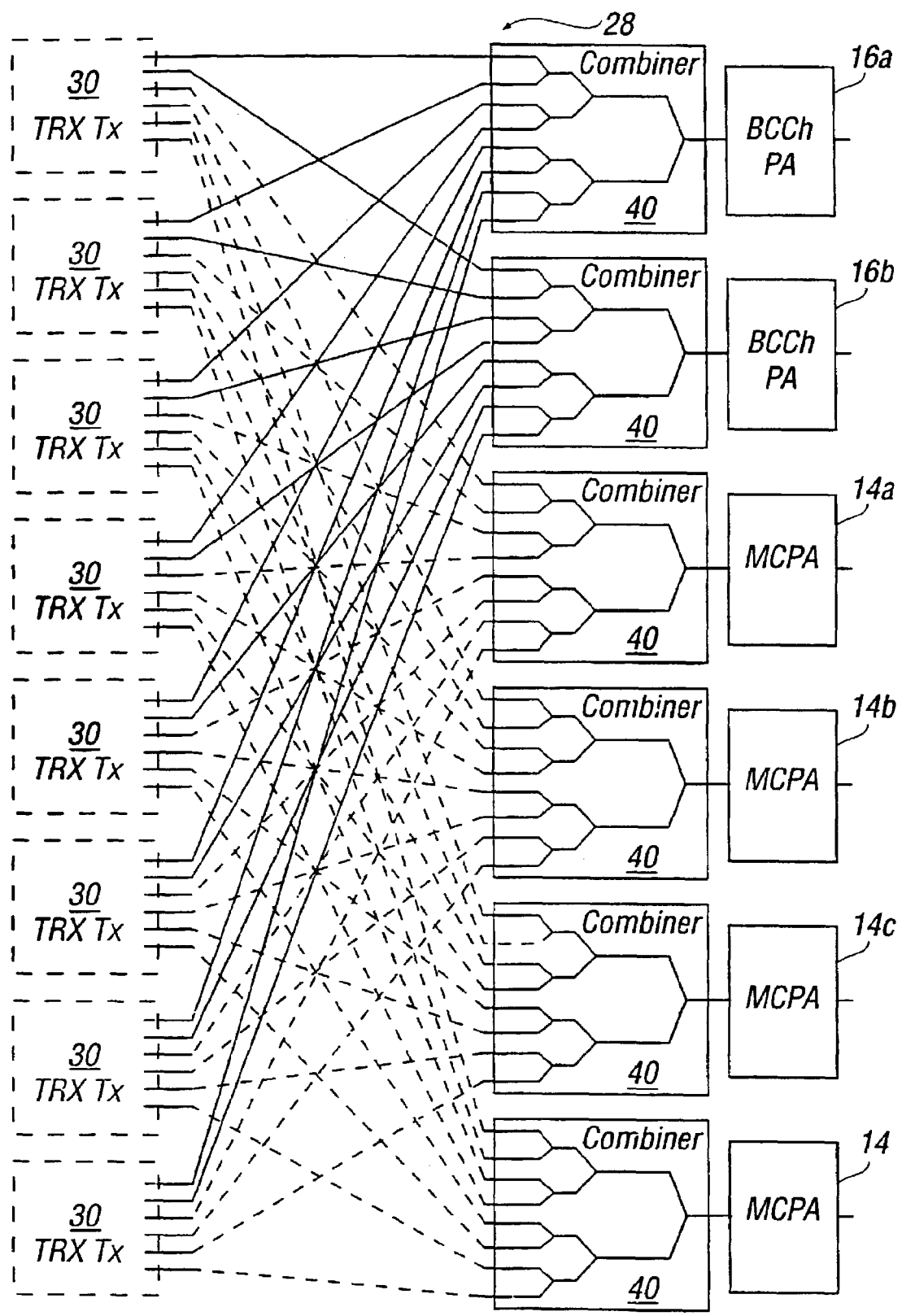
FIG. 5 shows the cross connect of FIG. 4 in more detail, for the transmit path.

Reference will now be made to FIG. 5 which shows the cross connect unit 28 of FIG. 4 for transmitted signals, in more detail.

As can be seen from FIG. 5 the cross connect unit 28 comprises hybrid combiners 40. The output of each combiner 40 is connected to a respective one of the power amplifiers 14 or 16. Whilst only six combiners are shown in FIG. 5, in practice, there will be seven or eight combiners for a 6-column antenna, one for each amplifier.

Each combiner 40 is connected to each one of the RF units 30. In particular, the respective combiners 40 are connected to the transmit part of each RF unit. Thus, each combiner 40 will receive as many inputs as there are radio frequency units 30. The number of combiner inputs is preferably greater than or equal to the number of RF units 30.

Consider one of the RF units 30. One RF unit 30 is arranged to cause a given signal to be transmitted in a given beam direction or directions. Accordingly, the radio frequency unit 30 will generate a version of the signal to be transmitted by each of the respective antennas 12. The different versions of the signal will differ in their phase and amplitude such that destructive and constructive interference occurs in the required directions. As discussed previously, each antenna 12 transmits a number of different signals. These different signals are generated by the respective radio frequency unit and combined by the combiner 40. In the example shown in FIG. 5, the combiners 40 receive 8 different signals, which will be at different frequencies. Those signals will be combined by the combiner 40 and output to the respective antenna 12.

Figure 6:
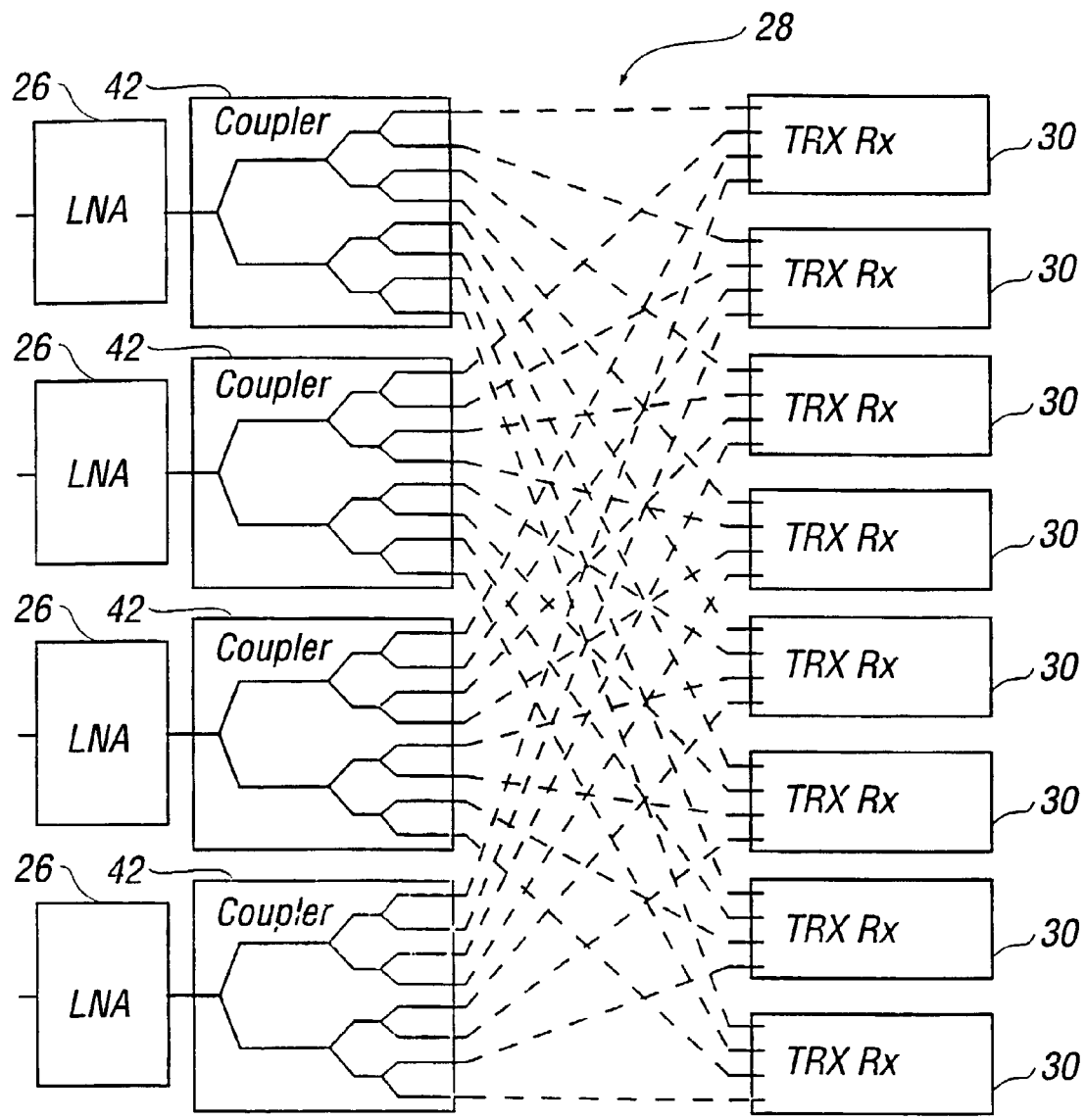
FIG. 6 shows the cross connect of FIG. 4 in more detail for the receive path.

Reference will now be made to FIG. 6 which shows the cross connect unit 28 of FIG. 4 for received signals, in more detail.

As can be seen from FIG. 6, the cross connect unit 28 comprises multi couplers 42. There is one coupler 42 per antenna column/stack.

The signals received by the respective antenna are amplified by a low noise amplifier, which is in the duplexer of FIG. 4. The signals which are received by each low noise amplifier 26 will be those signals which are received by the respective antenna 12 and will consist of a number of signals at different frequencies. Each element 12 of the array will receive a version of each signal. The versions of the same signal which are received will differ in their phase, depending on the direction from which that signal has been received.

The output of each low noise amplifier 26 is input to a coupler 42. The coupler 42 separates the signals received from a given antenna 12. The coupler is arranged to output each of the signals which it has received to a different one of the radio frequency units 30. The couplers 42 are arranged so that signals from the same, for example, mobile station, are output to the same radio frequency unit. For example, if a given mobile station has transmitted a signal to the base station which has been received by each of the antennas 12, the signal received from each of the antennas is output by the respective couplers 42 to the same radio frequency unit 30. Using the phase information contained in the signal, the radio frequency unit 30 is able to determine the direction from which the signal has been received. The radio frequency unit may also combine the separate signals.

Figure 7:
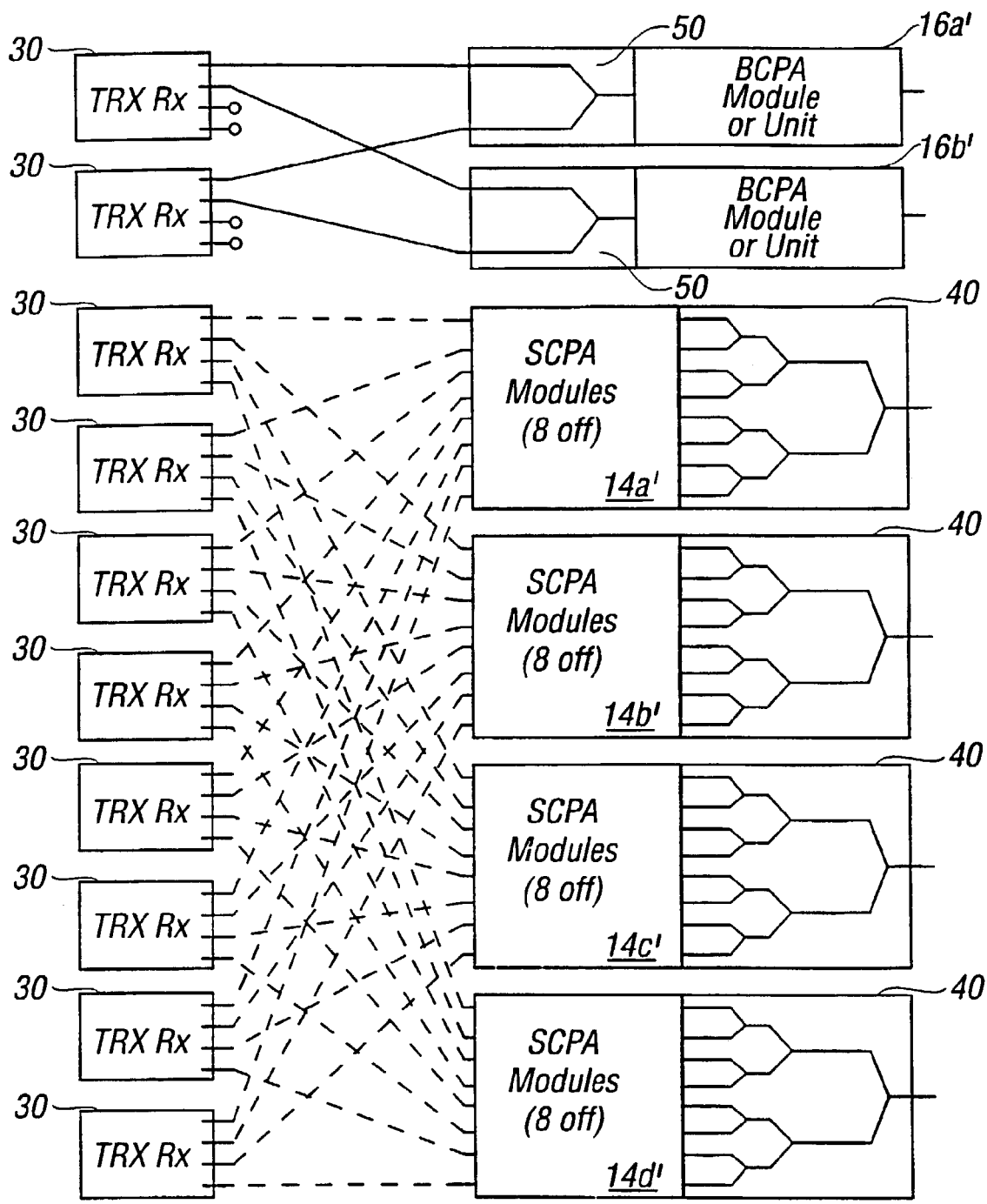
FIG. 7 illustrates an alternative embodiment of the present invention.

Reference is made to FIG. 7 which shows an alternative to the arrangement of FIG. 5. In the arrangement shown in FIG. 7, two of the radio frequency units 30 are dedicated to the BCCH channel. Each of those two radio frequency units 30 is input to a combiner 50 which combines the two signals received from the two radio frequency units 30. The combined signals are output to respective power amplifiers. These are the single carrier power amplifiers 16a and 16b shown in FIG. 2.

The remaining radio frequency units 30 are each connected to the single carrier power amplifier units (SCPA) 14. One SCPA is provided for each antenna. In particular, each of the single carrier power amplifier units 14 generates a signal for each antenna column. These signals will be at different frequencies and are input to the single carrier power amplifier unit which separately amplifies the signals from the RF units that are for the particular antenna column fed by the single carrier power amplifier unit. The separately amplified signals are then combined by the combiner 40. The output of each combiner 40 is connected to their antenna column (stack).

Reference is now made to FIG. 8. FIG. 8 shows for each of six antennas of an array the average voltage EMF which is applied to each antenna, on average. As can be seen from FIG. 8, the signals of the central elements 3 and 4, on average have a higher power. In contrast, the two antennas which are at either end of the array are such that, on average, the signals have a much lower power. As can be seen the power of the signals applied to the elements tapers from the maximum average power at the centre of the array to the respective ends of the array. It is for this reason that, in preferred embodiments of the present invention, the amplifier for the BCCH channel is applied to the elements at either end of the array. In typical embodiments of the present invention, the ratio between the power applied to the end antennas compared to the power applied to the central antennas is of the order of 0.6–0.7:1.

It is possible in alternative embodiments of the present invention that the profile shown in FIG. 8 is not provided. In those embodiments in the present invention, it is preferred that the amplifiers for the broadcast control channel be applied to those antenna which, on average, have a lower power applied to them.

In the embodiment of the invention described above, the single carrier power amplifier is described as being provided for use with the broadcast control channels. It should be appreciated that this principal can be used with any other channel in the GSM system. It should also be appreciated that embodiments of the present invention can also be used with systems other than GSM. In those situations, it is preferred, but not essential, that the single carrier power amplifiers be used with reference channels which are intended to the entire cell.

Embodiments of the present invention may also be used with non frequency division multiple access systems.

The invention claimed is:

1. An antenna system for a transmitter, said antenna system comprising:
   an array of antennas, said array being controllable to transmit a signal over part or all of a coverage area of said transmitter;
   an amplifier coupled to each antenna, said amplifier being arranged to receive one or more signals to be transmitted by the respective antenna, whereby said amplifiers are arranged to receive said signals such that in use the antenna system is able to provide steered beams; and
   a further amplifier connected to at least one of said antennas, said further amplifier arranged to receive a signal to be transmitted over substantially all of the coverage area of said transmitter.

2. An antenna system as claimed in claim 1, wherein said amplifier connected to each antenna is a multi carrier amplifier which is arranged to receive a plurality of signals at different frequencies.

3. An antenna system as claimed in claim 1, wherein said amplifier connected to each antenna is a single carrier amplifier which is arranged to receive signals in single frequency range.

4. An antenna system as claimed in claim 1, wherein said further amplifier is a single carrier amplifier.

5. An antenna system as claimed in claim 1, wherein two of said antennas are connected to respective further amplifiers.

6. An antenna system as claimed in claim 1, wherein said at least one antenna to which the further amplifier is connected is at an end of the array.

7. An antenna system as claimed in claim 1, wherein an output of said further amplifier and an output of said amplifier connected to the same antenna as said further amplifier are both: connected to an output of a combiner, an output of which is connected to said same antenna.

8. An antenna system as claimed in claim 7, wherein said combiner comprises a hybrid.

9. An antenna system as claimed in claim 1, wherein said antenna array is a smart antenna array.

10. An antenna system as claimed in claim 1, wherein said antenna array provides a predetermined number of beam directions one or more of which are selectable.

11. A base transceiver station comprising an antenna system as claimed in claim 1.

12. A base station as claimed in claim 11, wherein the further amplifier is arranged to receive a reference signal.

13. A base station as claimed in claim 12, wherein the base station is a GSM base station and the reference channel is a BCCH channel.

* * * * *